Sept. 13, 1932.    C. J. MINTON    1,876,723
TRACTOR HITCH FOR FARM IMPLEMENTS
Filed July 31, 1930    3 Sheets-Sheet 3
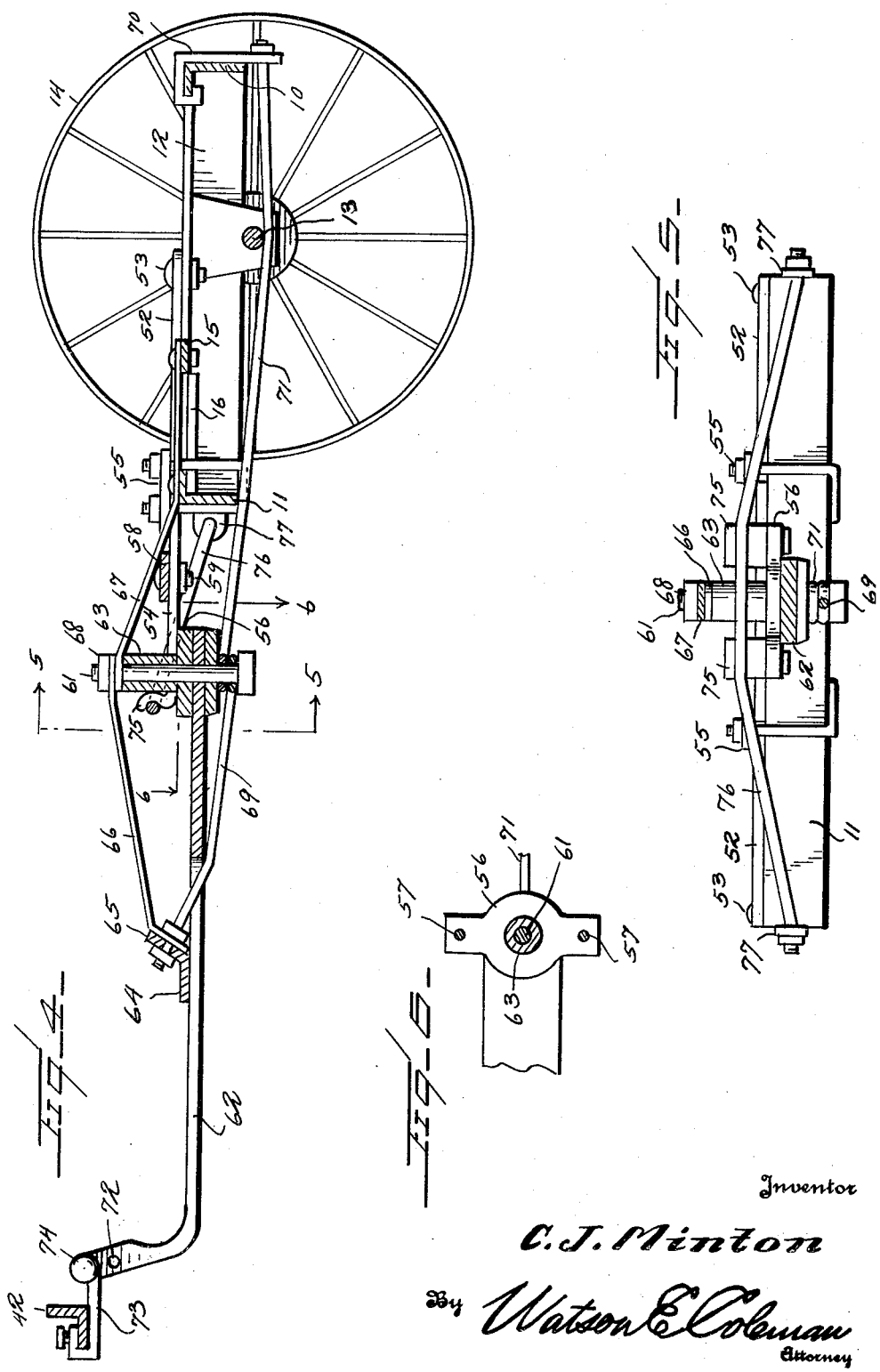
Inventor
C. J. Minton
By Watson E. Coleman
Attorney Patented Sept. 13, 1932

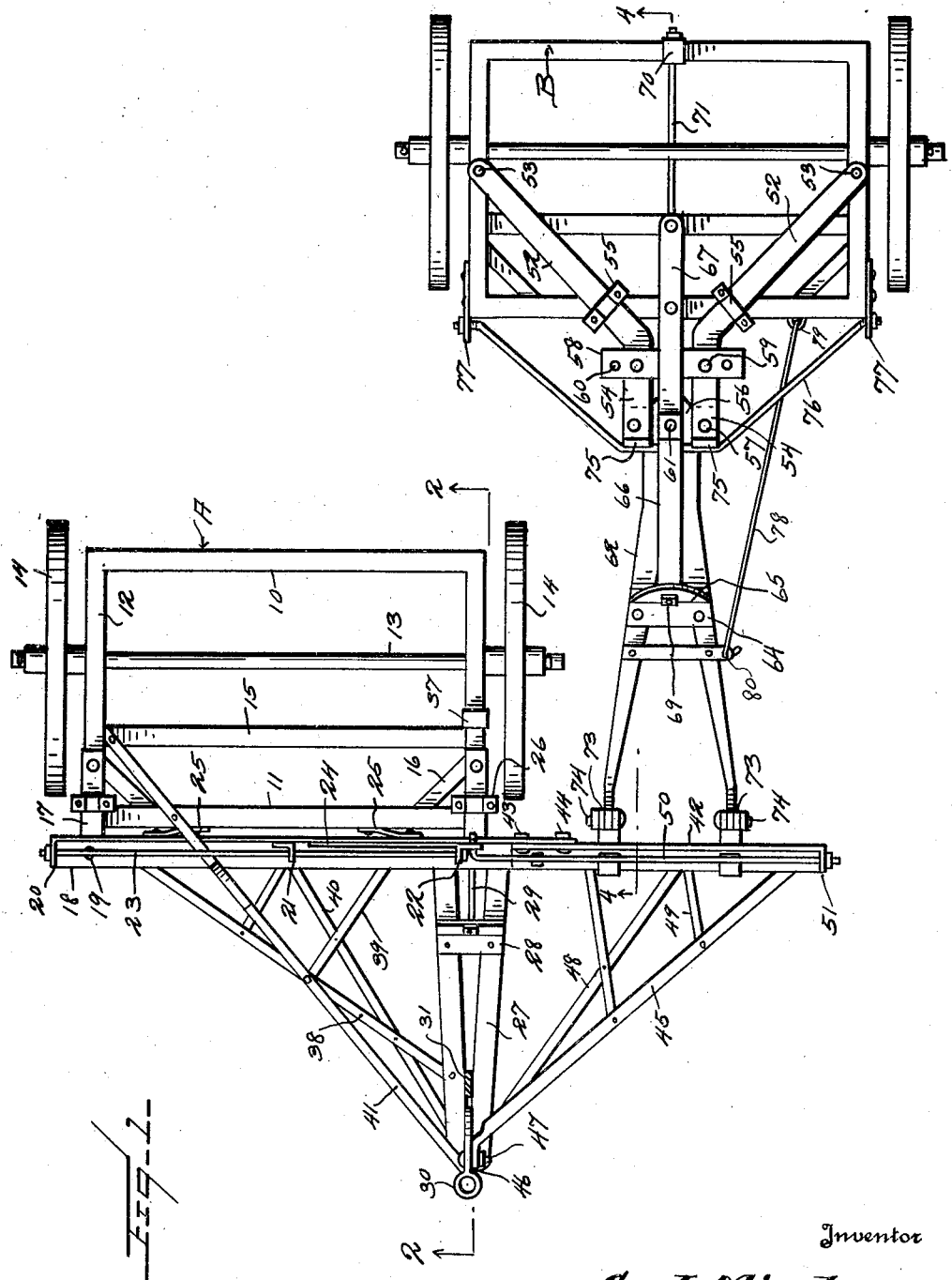

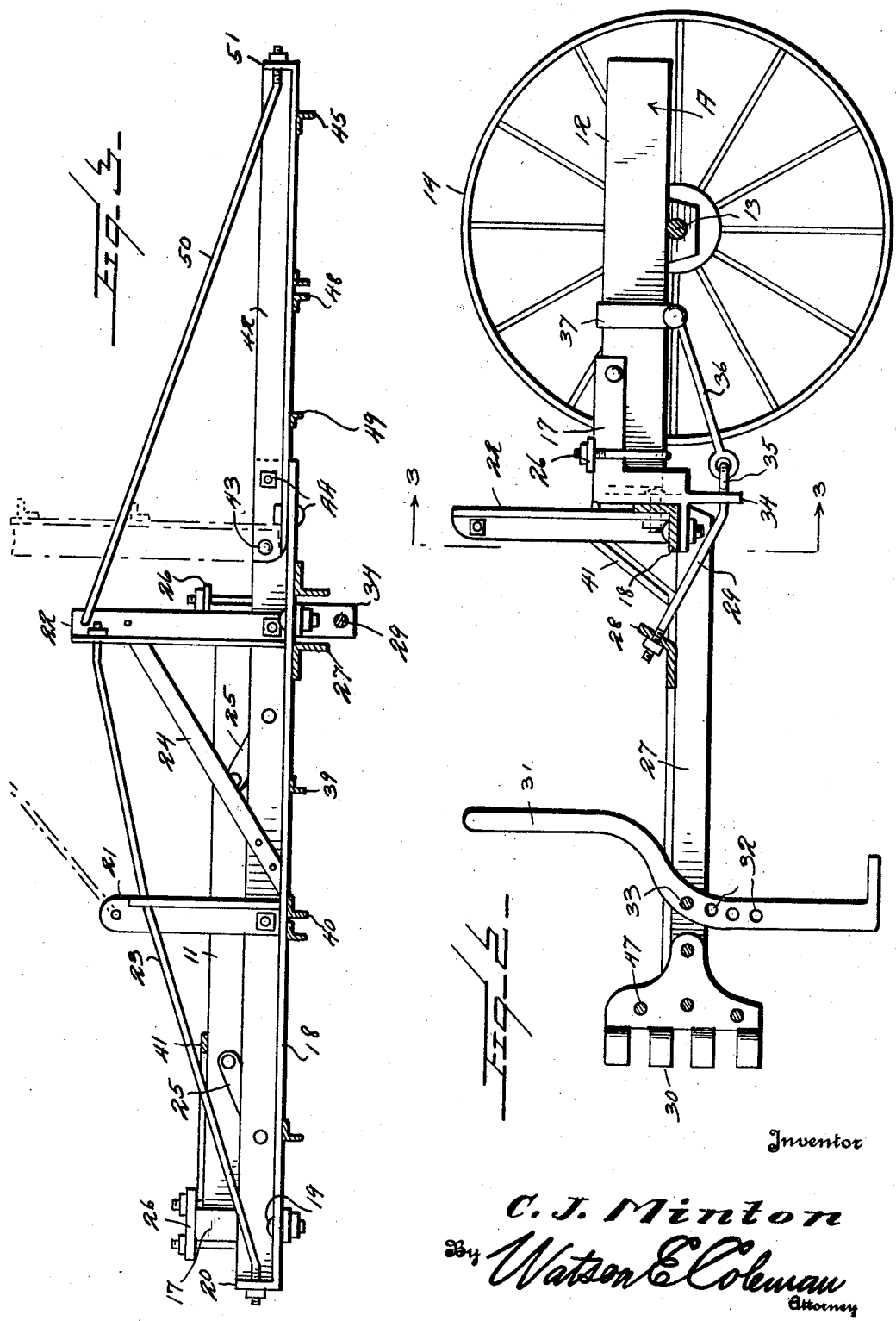

1,876,723

UNITED STATES PATENT OFFICE

CALVIN J. MINTON, OF GAGE, OKLAHOMA

TRACTOR HITCH FOR FARM IMPLEMENTS

Application filed July 31, 1930. Serial No. 472,081.

This invention relates to agricultural machinery and particularly to means whereby one implement may be hitched behind another implement in offset relation to the first named implement so that the two implements may be drawn, as for instance, by a tractor over the ground at the same time, this being particularly convenient for use with grain drills.

A further object is to provide a construction of this character which will permit the trailing grain drill or other implement to trail properly when the forward implement is turning a corner of a field.

Another object is to provide means whereby the transversely extending bar to which the rearward implement is normally attached may be turned up into a vertical position so as to permit, after the trailing implement has been detached from the bar and disposed immediately behind the forward implement, the two implements to pass through gates, over narrow bridges, along roads or be drawn through any narrow places where the two implements disposed more or less side by side cannot be drawn.

Another object is to provide means whereby the tongue of the forward implement may be held in a raised position at any desired height so that the tractor may be backed up and hitched to it.

A further object is to provide means whereby a trailing implement may be hitched to a forward implement and whereby the hitching mechanism may be adjusted to adapt it to different widths of trailing implement.

Other objects will appear in the course of the following description.

My invention is illustrated in the accompanying drawings, wherein:—

Figure 1 is a top plan view of my tractor hitch constructed in accordance with my invention;

Figure 2 is a section on the line 2—2 of Figure 1;

Figure 3 is a section on the line 3—3 of Figure 2;

Figure 4 is a section on the line 4—4 of Figure 1;

Figure 5 is a section on the line 5—5 of Figure 4;

Figure 6 is a section on the line 6—6 of Figure 4.

In the drawings, A designates generally the forward implement and B the rear implement. These implements in the illustration used are considered as grain drills, each grain drill comprising a rectangular, wheeled frame upon which the drill is mounted. As illustrated, the frame for the forward implement comprises the rectangularly arranged frame bars 10, 11, and 12, 12 being the two end bars of the frame. These support the usual axle 13 with the wheels 14. A transverse brace 15 extends across the frame forward of the axle and the frame is braced by the diagonal braces 16 extending from the end frame bars 12 to the forward bars 11. It will be understood that I do not wish to be limited to this particular construction of frame.

Preferably, detachably mounted upon the forward ends of the end bars 12 are the downwardly and forwardly extending brackets 17 which are angular in cross section and which at their forward ends are extended beneath a cross bar 18 and bolted thereto as at 19. This cross bar is formed of angle iron and at one end is formed to provide an end wall 20. The other end of the cross bar extends beyond the adjacent end frame 12.

Uprights 21 and 22 are attached to this cross bar as shown. A truss rod 23 passes through these uprights or posts and extends through the end wall 20 and is provided at its ends with nuts whereby the truss rod may be placed under tension, thus acting to truss this main cross bar 18. A brace 24 connects the post 22 with the vertical web of the transverse angle iron or cross bar 18. Braces 25 are disposed between the vertical web of the cross bar 18 and the vertical web of the transverse forward frame bar 11. The brackets 17 are held upon the end frame bars 12 in any suitable manner, as for instance by bolts or by the U-clamps 26.

Thus it will be seen that this cross bar may be readily attached to the frame of an agricultural implement such as a planter or grain drill or detached therefrom.

Attached to one end of the cross bar 18 are a pair of forwardly directed angle irons 27 constituting together a tongue. These angle irons are connected at their forward ends by rivets or bolts or any other suitable means and intermediate their ends by a transverse web 28 through which a truss rod 29 passes. Disposed between the forward ends of the angle irons 27 constituting the tongue is a clevis 30 of any ordinary or suitable construction, but having a plurality of eyes spaced apart from each other so as to permit engagement with the draw bar of a tractor of various heights. Just rearward of the clevis 30, there is disposed a pivoted foot or support designated generally 31 which has a plurality of apertures 32 through any one of which a pivot bolt 33 may pass. When the upper end of this lever is thrown forward, the lower end is raised off the ground. When the upper end of the lever is thrown rearward, the foot is disposed so as to raise the tongue to the proper level for engagement with the draw bars of the tractor as the latter backs into position.

Extending downward from the bracket 17 directly rearward of the tongue is a strut 34. The truss rod 29 extends downward and rearward and is then angularly bent to extend through an eye formed in this truss rod and is provided with an eye 35. A second truss rod section 36 engages the eye 35 at one end and at its other end is pivotally engaged with a clip or clamp 37, clamped upon the adjacent end beam 12 of the frame A. The tongue is braced by the relatively long angle iron brace 38 which extends from a point adjacent the forward end of the tongue rearwardly and laterally to a point adjacent one end of the cross bar 18.

From this brace extend truss braces 39 which engage with the lower flange of the cross bar 18 at spaced points. From approximately the middle of the cross bar 18 extends a brace bar 40 which extends to the forward end of the tongue and directly to the clevis and is riveted or bolted thereto. Attached to the forward end of the tongue and extending rearwardly and laterally therefrom is the relatively long brace 41 which is attached to the brace 38 and one of the braces 39 and is bolted or otherwise attached to the bar 11 of the tractor and to the adjacent end bar 12. Thus the tongue is rigidly held at right angles to the cross bar 18 and the draft of the tractor is evenly distributed to the frame of the implement A.

Pivoted to the vertical web of the angle iron cross bar 18 is a cross bar extension 42 which is pivoted at 43 and normally extends laterally from and constitutes an extension of the cross bar 18, it being held in this position by bolts 44. From the extremity of this extension 42, extends a brace 45 which is preferably formed of angle iron which is bolted, welded or otherwise attached to the extremity of the cross bar section 42 and at its forward end is formed with an eye 46 through which passes a bolt 47 engaging this eye with the clevis 29 adjacent the upper end of the clevis. Riveted or otherwise attached to the forward end of this brace 45 is a second brace 48 likewise preferably of angle iron which is engaged with the cross bar section 42 intermediate its ends and diagonal braces 49 extend rearward from the brace 45 to spaced points on the cross bar section 42.

Thus it will be seen that when this cross bar section 42 is in a horizontal position, that the draft of the tongue will be equally applied to this cross bar section as well as to the cross bar 18. A truss rod 50 is engaged through an opening in an end flange 51 on the cross bar section 42, this truss rod extending upward to the upper end of the post 22 and being provided with a hook engaging in a perforation in this post.

By removing the bolt 47 and all of the bolts 44, the cross bar section 42 may be turned upon its pivot 43 into a vertical position and held in this position by engagement of the hooked end of the truss rod 50 with a perforation in the upper end of the post 21. This is necessary where the implements are to be drawn through narrow gateways, long narrow roads, through arches, beneath bridges, etc. Under these circumstances, of course, trailing implement B is to be detached from the extension cross bar 42 and attached directly rear of the frame of the implement A.

The means whereby the trailing implement is adapted to be connected to the forward implement is as follows:—

The trailing implement is likewise shown as being formed of a rectangular frame constructed in the same manner as the frame of the forward implement. Bolted or otherwise attached to this frame are the two draft rods 52 which are bolted at 53 to the end members of the frame of implement B, extend forward across the forward cross bar of the frame diagonally and then are bent to extend straight forward as at 54. These bars 53 are held to the forward frame bars by means of U-bolts and clamps 55 or in any other suitable manner.

Connected to the forward ends of these bars 54 is a transverse member 56 to which the bars are bolted as at 57 and extending across these bars rearward of the members 56 is a cross bar 58 having bolts 59 passing through the bars 52. This cross bar is preferably provided with a plurality of bolt openings 60 so that the distance between the forward ends of the members may be adjusted to suit the circumstances of operation and to more particularly permit the bars 52 to be expanded at their rear ends or contracted so as to suit different makes of drill or implements which have different lengths. Extending through the cross member 56 is a king bolt 61 and mounted upon this king bolt is the tongue 62. The king bolt extends upward through the member 56, this member being provided with the sleeve 63 through which the king bolt passes. The tongue is bifurcated or forked and the two arms of the fork are connected by a transverse web 64 having an upwardly inclined portion 65 and bolted to this web is a truss rod or bar 66 which at its rear end is apertured for the passage of the king bolt. A second truss rod 67 is bolted to the frame of the trailer B and extends forward and upward and overlaps at its forward end the rear end of the truss bar 66 and through this truss bar 62 king bolt passes, the king bolt being provided with the nut 68.

Also passing through the web 64 is a downwardly and rearwardly extending truss rod 69 which has an eye at its rear end through which the lower end of the king bolt passes and engaged by means of a clamp 70 with the rear cross bar of the trailer frame is a truss rod 71 which extends beneath the frame of the trailer B and at its forward end is formed with an eye through which the king bolt passes. It will be seen, therefore, that the trailer is pivoted to the tongue so that it may turn relative to the tongue in swinging around corners or on any turning movement of the forward implement.

The forward ends of the two arms of the bifurcated tongue 62 are extended upward and provided with a plurality of bolt holes 72. Plates 73 are slotted to embrace the forward ends of the arms of the tongue and these plates are pivoted to the forward ends of the arms by bolts 74 passing through any one of the openings 72. These plates 73 are adapted to be bolted, clamped or otherwise engaged with either the extension cross bar 42 or with the rear cross bar 10 of the frame of the forward implement A. By using clamps for connecting these plates 73 to the extension cross bar 42, the trailing implement may be adjusted along the cross bar 42 so as to put it in the exact position required to coact with the forward implement and so that no furrow will be missed or skipped in said planting. By reason of the fact that the drilling implement is pivoted to its tongue 62, the trailing implement will trail properly behind the forward implement and plant seed without skipping or missing even when the forward implement is turning around in a field or turning at the corners of a field.

In order to brace the ends of the implement frame B, from the tongue supporting mechanism, I provide on the plate 56, the upwardly extending lugs 75 which are formed with seats for a truss rod 76. The ends of this truss rod pass through brackets 77 and are provided with nuts and the middle of the truss rod passes through the lugs 75 and engages in said seats. By tightening up upon the bolts, the truss rod may be tensioned so that the draft strain will be distributed to the ends of the frame B. The brackets 77 may be detachably connected to the end members of the frame B by bolts or in any other suitable manner.

In order when travelling to prevent the trailer from any zig-zag movement and provide for stiffly connecting the tongue to the trailer, I provide a stay rod 78 which at its rear end is hooked and engaged by a clamp 79 on the front cross bar of the frame B as shown in Figure 1, and at its forward end is hooked and engaged in an aperture 80 formed in the tongue in one of the side bars of the tongue 62. It will be understood that this stay rod 78 is only used when it is desired to hold the tongue rigidly in relation to the frame B and prevent this tongue from swinging upon the pivot pin 61.

It is within the purview of my invention to provide a second extension member 42 with braces 45 and 48 etc., on the other side of the cross bar 18 so that two trailers may be drawn, one on each side of the implement A. This is not shown for the reason that it is merely a duplication of what is illustrated in Figures 1 and 3 but on the opposite side of the machine.

While this mechanism is particularly adapted for grain drills, I do not wish to be limited thereto as it is obvious that the means shown might be used in connection with any other pair of implements where it is desired that one be drawn behind the other in offset relation.

It will be seen that my construction provides a tractor hitch which is adapted to be attached to two implements, one to be trailed behind the other, but in offset relation and at the same time provides for the trailing vehicle being detached and the pivoted extension of the cross bar of the hitch turned upward into a vertical position so that the implements may pass through narrow openings or along narrow roads.

It will further be seen that the tongue is fully braced against lateral strains due to turning movements and that draft strains and lateral strains are distributed along the cross bar of the hitch to its full extent and that the hinged section of this cross bar is also fully braced to the tongue of the hitch.

It will further be seen that both the front and rear hitch are adapted for various forms of implements and implements having different lengths and that by pivoting the tongue of the rear hitch, the trailing implement will track properly when a turn is made. Furthermore by the use of the adjustable lever on the front end of the tongue having the ground engaging foot, the forward end of the tongue may be adjusted up or down and held in a properly adjusted position for the tractor to back up to the clevis of the tongue and be properly engaged therewith.

It will likewise be seen that while I have illustrated my device as an attachment, it might be incorporated directly with the two wheeled implement frames.

I claim:—

1. A trailer hitch of the character described, including a cross bar having a tongue, means to detachably hold the cross bar upon an implement frame, an extension pivoted to one end of the cross bar for movement in a vertical plane transversely of the hitch, means on the extension extending forward and inward and adapted to be detachably engaged with the tongue, means detachably engaging the extension and cross bar and holding the extension in a horizontal laterally extended position, and means for supporting the extension in a vertical position.

2. A trailer hitch of the character described, including a cross bar having a tongue, means to detachably hold the cross bar upon an implement frame, an extension pivoted to one end of the cross bar for movement in a vertical plane transversely of the hitch, means on the extension extending forward and inward and adapted to be detachably engaged with the tongue, means engaging the cross bar and extension and positively holding the extension in a horizontal, laterally extended position, means operatively engaging the cross bar with the extension and positively supporting the extension in a vertical position, and a second trailer hitch including a tongue having detachable engagement with the extension.

3. A trailer hitch of the character described, including a main cross bar, brackets extending upward and rearward from the main cross bar and adapted to be detachably connected to the frame members of an implement frame, a tongue attached to one end of the main cross bar, braces extending diagonally from the cross bar to the extremity of the tongue, an extension cross bar pivoted to that end of the main cross bar to which the tongue is attached and normally extending laterally therefrom in a horizontal plane, braces extending forward and laterally from the extension and having means whereby they may be detachably engaged with the tongue, and means for holding the extension cross bar either in a horizontal position or in a vertical position.

4. A trailer hitch of the character described, including a main cross bar, brackets extending upward and rearward from the cross bar and adapted to be detachably connected to an implement frame, a tongue attached to one end of the main cross bar, braces extending diagonally from the cross bar to the extremity of the tongue, an extension pivoted to that end of the main cross bar to which the tongue is attached and normally extending laterally therefrom in a horizontal plane, braces extending forward and laterally from the extension and having means whereby they may be detachably engaged with the tongue, and means for holding the extension either in a horizontal position or in a vertical position including upwardly extending posts mounted on the extension and having apertures at their ends and a hooked rod engaging with the end of the extension and adapted to engage with the apertures of either of said posts.

5. A trailer hitch of the character described, including a cross bar having a tongue and having means whereby it may be detachably mounted upon an implement frame, posts extending upward on the cross bar, one of said posts being disposed opposite the base of the tongue, a truss rod extending from that end of the cross bar remote from the tongue and extending upward through the upper ends of the posts, an extension cross bar pivoted to that end of the cross bar adjacent the tongue, a forwardly and inwardly extending brace having means at its extremity whereby the brace may be detachably connected to the forward end of the tongue, and a truss rod engaged with the outer end of the extension and at its inner end provided with a hook whereby it may be detachably engaged with either of said posts.

6. A tractor hitch of the character described including a cross bar having a tongue and having means whereby it may be detachably engaged with an implement frame, an extension cross bar pivoted to one end of the first named cross bar rearward of the rear end of the tongue and having movement in a vertical plane, a brace extending from the extension forward and inward to the tongue and having means whereby it may be detachably engaged therewith, posts extending upward from the cross bar, a truss rod extending from one end of the cross bar upward and through said posts, a truss rod engaged with the outer extremity of the extension and detachably engageable with either one of said posts, a strut extending downward from the cross bar immediately behind the tongue, a truss rod engaging with the tongue and extending down beneath the adjacent extremity of the cross bar and engaged with said strut and a truss rod engaged with the first named truss rod and rearward of the strut and having a clamp whereby it may be engaged with an end member of the implement frame.

7. The combination with a front trailer hitch having a tongue and a lateral extension, of a rear trailer hitch comprising a king bolt supporting plate, bars pivoted to said plate and extending rearwardly and laterally therefrom, and having means whereby they may be attached to an implement frame, a cross bar holding said bars in laterally adjusted position, a tongue pivoted upon said king pin and extending forward therefrom and having a forked forward end, the arms of the fork having means whereby they may be connected to the extension of the first named hitch.

8. The combination with a front trailer hitch having a tongue and a lateral extension, of a rear trailer hitch comprising a king bolt supporting plate, bars pivoted to said plate for lateral swinging movement and extending rearwardly and laterally therefrom, and having means whereby they may be attached to an implement frame, a cross bar holding said bars in laterally adjusted position, a tongue pivoted upon said king pin and extending forward therefrom and having a forked forward end, the arms of the fork having means whereby they may be connected to the extension of the first named hitch, the tongue having an upwardly extending lug, a truss rod extending from said lug to the king pin, a truss rod extending rearward from the king pin and having a clamp at its rear end whereby it may be engaged with the rear of an implement frame, a truss rod extending from said lug upward and rearward and through which the king pin passes and a second truss rod through the forward end of which the king pin passes and extending rearward therefrom and having means whereby it may be detachably engaged with the frame of the implement, to which the hitch is attached.

In testimony whereof I hereunto affix my signature.

CALVIN J. MINTON.